United States Patent
Kurian et al.

(10) Patent No.: US 10,366,392 B2
(45) Date of Patent: Jul. 30, 2019

(54) MARKER CODE GENERATION FOR RESOURCE DISTRIBUTION AUTHORITY FLAGGING

(71) Applicant: BANK OF AMERICA CORPORATION, Charlotte, NC (US)

(72) Inventors: Manu Jacob Kurian, Dallas, TX (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 373 days.

(21) Appl. No.: 15/404,336

(22) Filed: Jan. 12, 2017

(65) Prior Publication Data

US 2018/0197181 A1   Jul. 12, 2018

(51) Int. Cl.
G06Q 20/40   (2012.01)
G06Q 20/10   (2012.01)
G07F 7/10   (2006.01)

(52) U.S. Cl.
CPC ..... *G06Q 20/4012* (2013.01); *G06Q 20/1085* (2013.01); *G07F 7/1016* (2013.01); *G07F 7/1025* (2013.01)

(58) Field of Classification Search
USPC ........................................................ 235/375
See application file for complete search history.

(56) References Cited

U.S. PATENT DOCUMENTS

| | | |
|---|---|---|
| 5,613,012 A | 3/1997 | Hoffman et al. |
| 5,764,789 A | 6/1998 | Pare, Jr. et al. |
| 5,790,677 A | 8/1998 | Fox et al. |
| 5,805,719 A | 9/1998 | Pare, Jr. et al. |
| 6,154,879 A | 11/2000 | Pare, Jr. et al. |
| 6,188,309 B1 | 2/2001 | Levine |
| 6,685,087 B2 | 2/2004 | Brown et al. |
| 6,789,189 B2 | 9/2004 | Wheeler et al. |
| 6,941,285 B2 | 9/2005 | Sarcanin |
| 6,978,369 B2 | 12/2005 | Wheeler et al. |
| 7,028,185 B2 | 4/2006 | Wheeler et al. |
| 7,051,929 B2 | 5/2006 | Li |
| 7,096,354 B2 | 8/2006 | Wheeler et al. |
| 7,127,606 B2 | 10/2006 | Wheeler et al. |
| 7,152,045 B2 | 12/2006 | Hoffman |
| 7,269,737 B2 | 9/2007 | Robinson |

(Continued)

*Primary Examiner* — Rafferty D Kelly
(74) *Attorney, Agent, or Firm* — Michael A. Springs; Moore & Van Allen PLLC; Nicholas C. Russell (57) ABSTRACT

Embodiments of the invention are directed to systems, methods and computer program products for generating unique marker codes for security implementation and deployment during authentication required resource disbursement. In this way, marker codes may be generated and associated with one or more resource disbursement mechanisms. The marker codes may be distributed and stored at third party devices. Upon identification of an input of a marker code, a specific response may be triggered. One or more marker codes may be associated with each disbursement mechanisms triggering various levels of responses from monitoring the resource disbursement to queuing communication with third party authorities for real-time dispatch. Thus, the system creates marker codes associated with non-obvious cues that control resource disbursement.

20 Claims, 6 Drawing Sheets

(56) References Cited

U.S. PATENT DOCUMENTS

| | | | |
|---|---|---|---|
| 7,552,467 B2 * | 6/2009 | Lindsay | G06F 21/31 726/5 |
| 8,615,438 B2 | 12/2013 | Hammad | |
| 8,620,825 B1 | 12/2013 | Barth et al. | |
| 8,868,462 B2 | 10/2014 | Nilsson | |
| 2005/0114367 A1 | 5/2005 | Serebrennikov | |
| 2010/0241564 A1 | 9/2010 | Miller et al. | |
| 2011/0035240 A1 | 2/2011 | Joao | |
| 2014/0330726 A1 | 11/2014 | Ball et al. | |
| 2016/0098705 A1 | 4/2016 | Kurapati | |

* cited by examiner

MARKER CODE GENERATION FOR RESOURCE DISTRIBUTION AUTHORITY FLAGGING

BACKGROUND

With advancements in technology, user resource access and distribution without authorization is becoming easier. As such, third parties may be able to manipulate resource access and distribution.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Card transactions can be enhanced with the addition of duress pins or other non-obvious cues, collectively marker codes that control transactions during the card usage at a public or crowded area. The addition of multiple pin levels will create an additional layer of security during events that include duress, caution, rotating, one time, dynamic, tracking, or the like.

In some embodiments, there are times when a card or transaction needs to be made by a dependent, in a heavy traffic area, or in a weakly secured area. Controlling the view, data entered/sent, or data leaked is important for the security of the transaction, the merchant, and the financial institution.

The system allows the user to input multiple pins or marker codes at a transaction location, such as at an ATM or the like in order to prompt one or more triggers. In some embodiments, the marker codes may be a normal pin, a duress pin, a caution pin, a rotating pin, or an additional pin. For example, a user may notice a bad actor or the like viewing the transaction display. The user may be able to input a marker code into the ATM that signals a duress or a caution for that transaction. In some embodiments, the use of the pin at the transaction site by the user dictates the terms of the transaction and/or the credit/debit usage.

Embodiments of the invention relate to systems, methods, and computer program products for marker code generation and deployment for authority flagging and dispatch, the invention comprising: generating marker codes for one or more resource cards associated with a user, wherein the marker codes are coded for a specific pin input, bio-data input, or geo-data input that trigger a triggering response; determining triggering response for each of the marker codes generated, wherein one or more marker codes are generated for each resource card associated with the user; storing user selected marker codes, automatically generated marker codes, and the determined triggering responses; distributing marker code data to pin accepting devices and within the marker code data code for direct communication of a use of the marker codes; identifying the use of a marker code at a pin accepting device based on code direct communication from the pin accepting device; communicating to necessary third parties the triggering response associated the marker code used by the user at the pin accepting device; manipulating appropriate third party security and monitoring based on the triggering response associated the marker code used by the user at the pin accepting device; and allowing user cancelation of the triggering response based on use of a predetermined cancelation marker input at a user device or the pin accepting device.

In some embodiments, the marker codes include duress marker codes, caution marker codes, and/or time/amount marker codes. The duress marker codes triggering response comprises communicating a silent signal call to the authorities requesting an immediate response to the location of the pin accepting device, wherein use of the duress marker code allows a transaction using the resource card to be completed at the pin accepting device. The caution marker codes triggering response comprises allowing a transaction using the resource card to be completed at the pin accepting device and continual monitoring of future use of the resource card for misappropriation. The time/amount marker codes triggering response comprises authorizing a transaction using the resource card to be completed at the pin accepting device under a predetermined amount of resource used to complete the transaction and within a predetermined time from for completion of the transaction.

In some embodiments, the pin input, bio-data input, or geo-data input of the marker code is different than a standard authorization pin required for authorizing the one or more resource cards.

In some embodiments, generating marker codes for one or more resource cards associated with a user further comprises allowing for user selected marker codes and triggering responses by providing the user with a marker code generation interface for user input of the marker codes and the triggering responses.

In some embodiments, the pin accepting device is an ATM or third party point of transaction device used to complete a transaction using the resource card of the user, wherein the resource card of the user is a transaction card requiring a standard authorization pin for authorizing the transaction using the resource card.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

As used herein a marker code or pin may refer to any alpha, numeric, or alpha numeric identification associated with a user account to complete a transaction using the account. As such, the marker code or pin provides authentication and/or authorization for the completion of a transaction for a specific user selected account.

In some embodiments, an ATM is configured (and/or the ATM application is executable) to authenticate an ATM user based at least partially on an ATM debit card, smart card, token (e.g., USB token, or the like), username, password, PIN, biometric information, and/or one or more other credentials that the user presents to the ATM. Additionally or alternatively, in some embodiments, the ATM is configured to authenticate a user by using one-, two-, or multi-factor authentication.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself. In some embodiments, the "user" may be a customer (e.g., an account holder).

The system may generate marker codes. These marker codes may be generated and deployed for each specific transaction card associated with a user. In some embodiments, the marker codes may be stored on the transaction card. In other embodiments, the system may distribute the marker codes to be stored at pin accepting devices. In yet other embodiments, the system may receive signals from a pin accepting device of use of the marker codes. Marker codes may be a pin number used by a user at a transaction device, such as a pin accepting device or the like that may trigger a response by the system or a third party that is not a normal response based upon a pin input. In some embodiments, the marker codes may also be bio-data or geo-data codes. Typically, a user may utilize a transaction card to complete a transaction. These transaction cards, in some instances, may require a pin number, bio-data, geo-data, or the like to authenticate the transaction and allow for completion of the transaction. Entering a pin at a pin accepting device will either authorize the completion of the transaction or deny the transaction. The generated marker codes associated with that transaction card trigger alternative, non-obvious, responses to the input of the specific marker code in place of the user's standard pin.

In this way, card transactions may be enhanced with the addition of marker codes that are non-obvious cues that control transactions during the card usage at a public or crowded area. The addition of multiple pin levels will create an additional layer of security during events that include duress, caution, rotating, one time, dynamic, tracking, or the like.

In some embodiments, there are times when a card or transaction needs to be made by a dependent, in a heavy traffic area, or in a weakly secured area. Controlling the view, data entered/sent, or data leaked is important for the security of the transaction, the merchant, and the financial institution.

The system allows the user to input marker codes at a transaction location, such as at an ATM or the like in order to prompt one or more response triggers. These response triggers may be actions performed by the system or third party that may be different than a standard pin authorization response. In some embodiments, the marker codes may be a normal pin, a duress pin, a caution pin, a rotating pin, or an additional pin. For example, a user may notice a bad actor or the like viewing the transaction display. The user may be able to input a marker code into the ATM that signals a duress or a caution for that transaction. In some embodiments, the use of the pin at the transaction site by the user dictates the terms of the transaction and/or the credit/debit usage.

In some embodiments, the marker codes may also be bio-data or geo-data codes. In this way, the user may be able to generate marker codes that include positioning of finger placement in a different direction, area, use of a different finger, or the like to indicate one of the marker codes. Furthermore, the location of a user use of a user device or pin accepting device may trigger the indication of a marker code, such as the moving of a pin accepting device to a different angle or the like.

Furthermore, each marker code may be disabled by the user. In this way, the user may be able to touch a number or letter on a mobile device or pin accepting device for an extended period of time (such as 5 seconds) in order to disable the marker code and thus not trigger the response.

Figure 1:
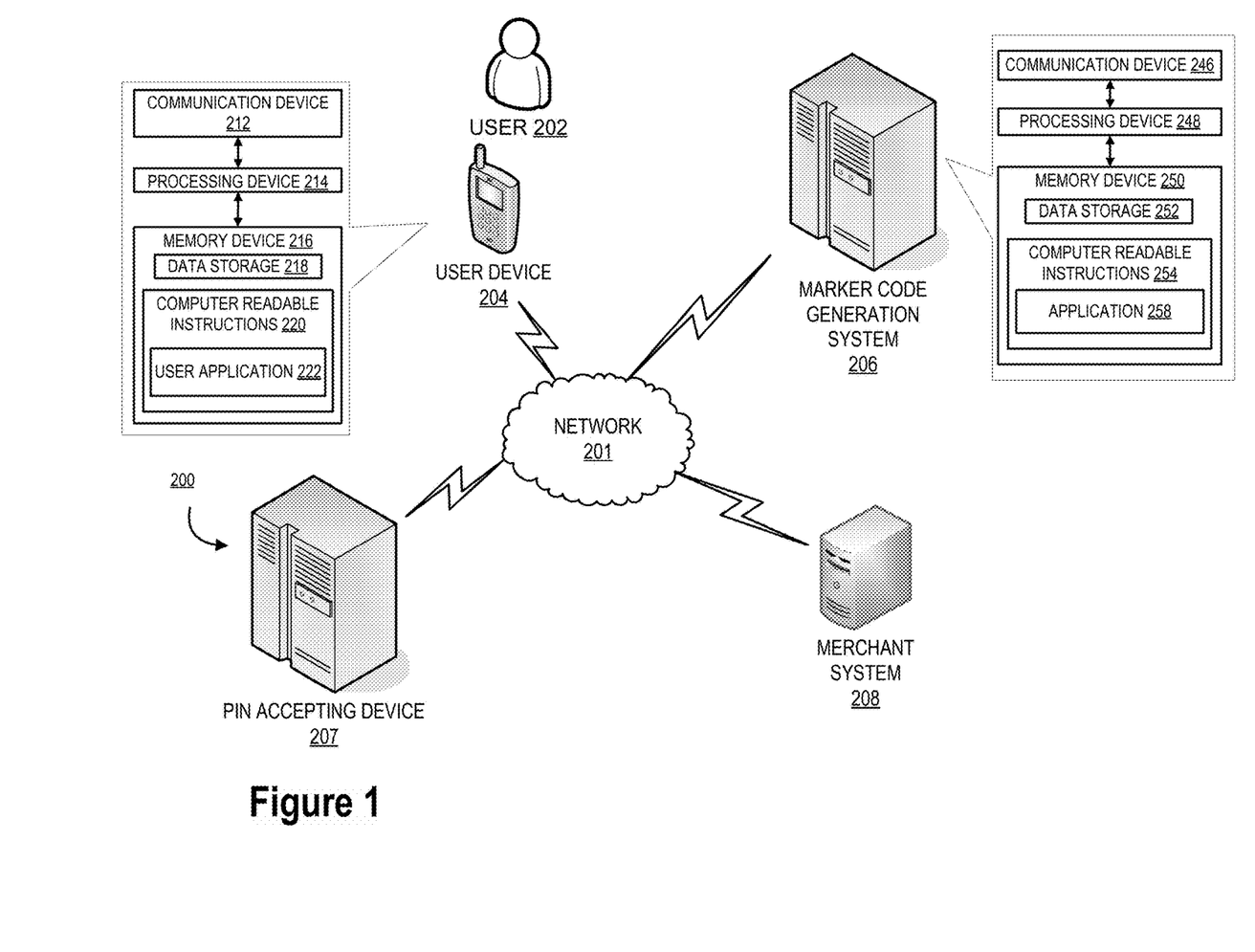
FIG. 1 illustrates marker code generation system environment, in accordance with embodiments of the present invention.

FIG. 1 illustrates marker code generation system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of generating logic code for marker code generation for resource distribution authority and flagging.

As illustrated in FIG. 1, the merchant system 208 is operatively coupled, via a network 201 to the user device 204, pin accepting device 207, and to the marker code generation system 206. In this way, the merchant system 208 can send information to and receive information from the user device 204, pin accepting device 207, and the marker code generation system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that is making a transaction at a merchant system 208 and/or a pin accepting device 207 using a transaction card that requires a pin or other authentication for utilization. This may include an ATM transaction, debit transaction, or the like. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the marker code generation system 206, the merchant system 208, and the pin accepting device 207. As such, the communication device 212 generally comprises a modem, server, or other device for communicating with other devices on the network 201. Furthermore, the user device 204 has stored the mobile wallet application from the pin accepting device 207.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes, send marker codes, and receive the necessary trigger responses.

As further illustrated in FIG. 1, the marker code generation system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 208, the pin accepting device 207, and the user device 204. As such, the communication device 246 generally comprises a modem, server, or other device for communicating with other devices on the network 201.

As further illustrated in FIG. 1, the marker code generation system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the marker code generation system 206 the memory device 250 stores an application 258. Furthermore, the marker code generation system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant system 208, pin accepting device 207, and/or user device 204.

As illustrated in FIG. 1, the pin accepting device 207 is connected to the merchant system 208, user device 204, and marker code generation system 206. The pin accepting device 207 has the same or similar components as described above with respect to the user device 204 and the marker code generation system 206. While only one pin accepting device 207 is illustrated in FIG. 1, it is understood that multiple pin accepting device 207 may make up the system environment 200. The pin accepting device 207 may be associated with one or more entities, such as resource providing machines, product providers, service providers, resource allocators, and the like. In this way, the pin accepting device 207 may be associated with any third party merchant, financial institution, or the like that the user 202 may transact with. Furthermore, a pin accepting device 207 is further illustrated in detail below with respect to FIGS. 4 and 5.

As illustrated in FIG. 1, the merchant system 208 is connected to the pin accepting device 207, user device 204, and marker code generation system 206. In some embodiments, the merchant system 208 may be associated with the marker code generation system 206 providing entity. In other embodiments, the merchant system 208 may be a third party system separate from the marker code generation system 206. The merchant system 208 has the same or similar components as described above with respect to the user device 204 and the marker code generation system 206. While only one merchant system 208 is illustrated in FIG. 1, it is understood that multiple merchant system 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The merchant system 208 may generally include a processing device communicably coupled to devices as a memory device, output devices, input devices, a network interface, a power source, one or more chips, and the like. The merchant system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the merchant system 208 described herein.

Figure 2:
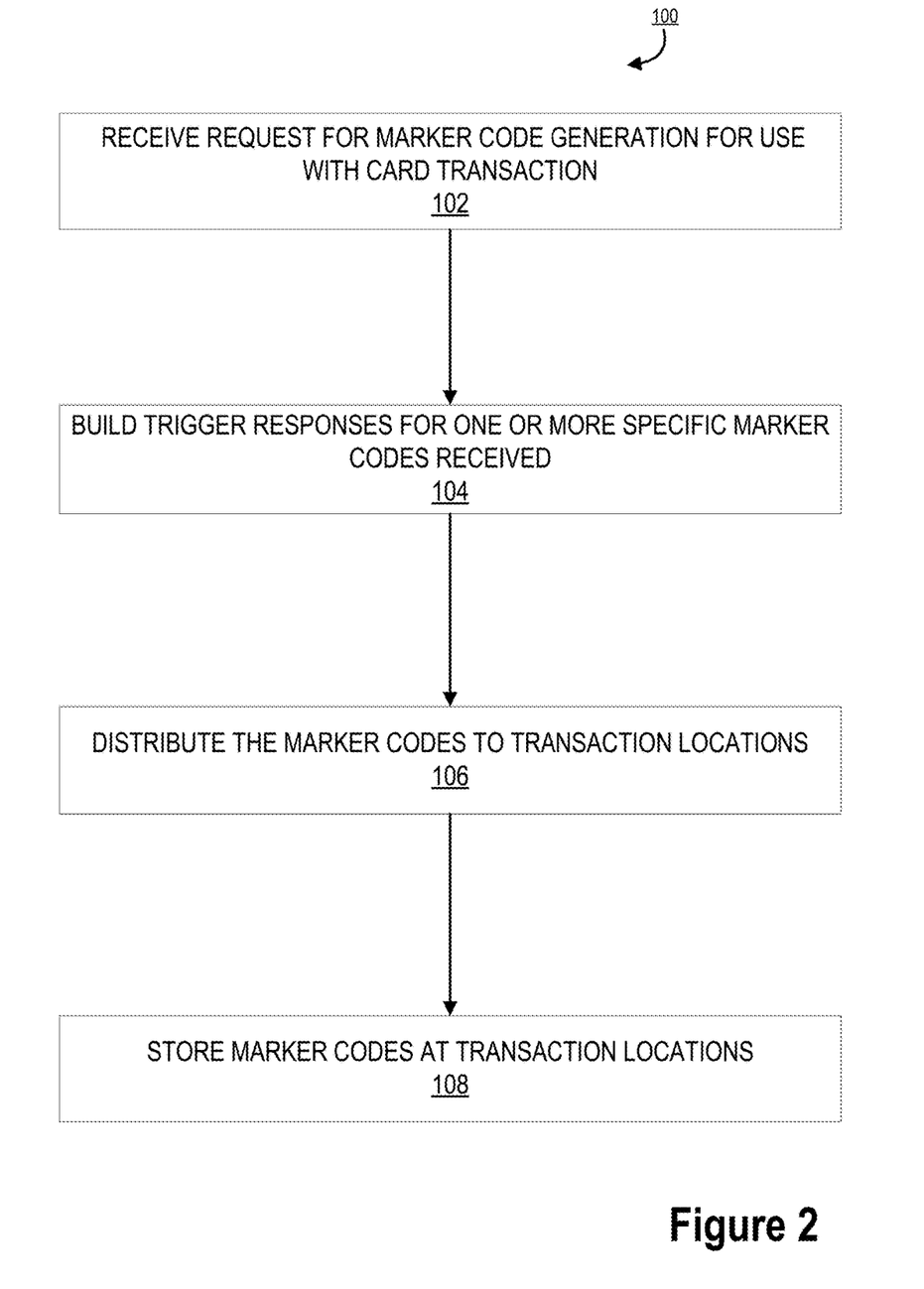
FIG. 2 is a flowchart illustrating marker code generation and deployment, in accordance with embodiments of the present invention.

FIG. 2 illustrates a marker code generation and deployment process 100, in accordance with embodiments of the present invention. As illustrated in block 102, the process 100 is initiated by receiving a request for marker code generation for use with a card transaction. In some embodiments, the user may send the request to the system. In yet other embodiments, the system may automatically set up one or more marker codes for the user. The marker codes may be associated with a single card the user has associated with a user resource account. The card may require a pin in order to authorize the completion of a transaction using the card. In this way, the card may be an ATM card, a credit card, a debit card, or the like. As such, upon use of the card, the user may be required to input a pin number that authorizes the completion of the transaction using the card. This pin number may be referred to herein as the user's standard pin or standard authorization pin. That is the pin number that the user has set to authorize the completion of the transaction. The requested marker codes may be utilized in place of the standard authorization pin when using the card during the transaction. The marker code triggers a response from the system when the user utilizes the marker code during the transaction in place of the user's standard authorization pin. In some embodiments, use of the marker code may prevent the completion of the transaction. In other embodiments, the use of the marker code may allow the transaction to be completed, but may track or otherwise trigger a response to monitor, track, trace, alert, or the like.

Once the system has received a request for marker code generation, the system provides the user with an interface for inputting specific marker codes and triggering responses associated with each marker code. The user may request one or more marker codes that include duress marker codes, caution marker codes, time/amount marker codes, rotating marker codes, or other customized marker codes. These various marker codes are described in more detail below with respect to FIG. 6. The user may request one or more of each of the types of marker codes each with a different triggering response.

As illustrated in block 104, once the interface has been presented to the user and the user has provided feedback regarding the marker codes that the user desires, the system may build the trigger responses for the one or more specific marker codes. In some embodiments, the marker codes and corresponding trigger responses may be provided by the user via an interface from user input. In other embodiments, the system may automatically provide marker codes and corresponding triggers for each card without user input.

Next, as illustrated in block 106, the process 100 continues by distributing the marker codes in a storage package of data points to the transaction locations. In this way, each transaction location may identify a marker code being inputted at the transaction location, such as the pin accepting device associated with the transaction.

Finally, as illustrated in block 108, the process 100 is completed by storing the marker codes at the transaction locations. In this way, the pin accepting device may be sent the data associated with each marker code for each transaction card for each user. The data packet may be provided to the pin accepting device, the pin accepting device may identify the marked code being inputted at the pin accepting device. In this way, the system may integrate a data packet into the pin accepting device and force the pin accepting device to read and trigger communication back to the system upon identification of a marker code inputted at the pin accepting device.

Figure 3:
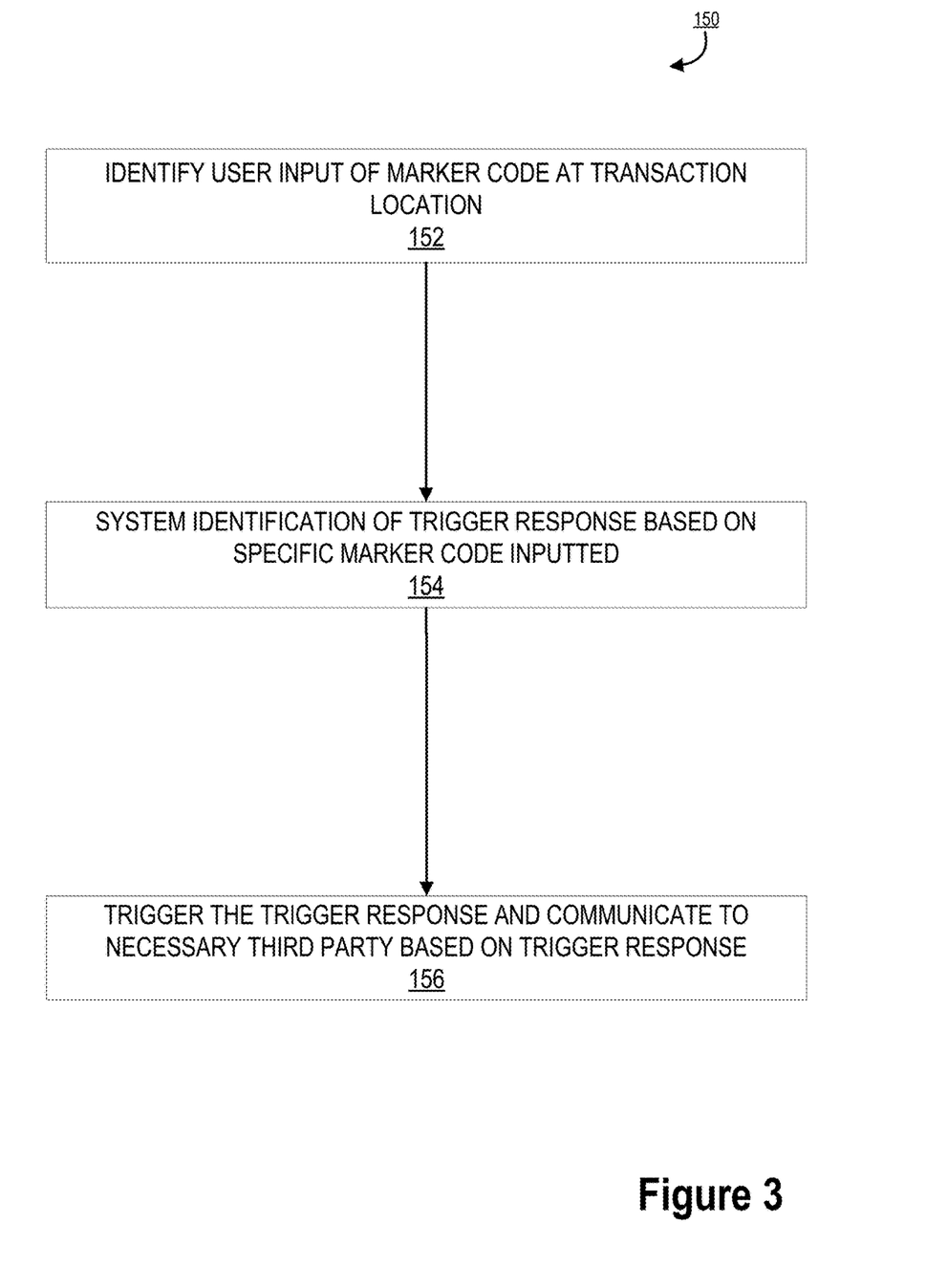
FIG. 3 is a flowchart illustrating the triggering of a response based on use of the marker code, in accordance with embodiments of the present invention.

FIG. 3 illustrates a flowchart for the triggering of a response based on use of the marker code 150, in accordance with embodiments of the present invention. The process 150 is initiated by identifying the user input of marker codes at a transaction location, as illustrated in block 152. As such, the user may be at a transaction location completing a transaction using a transaction card. The transaction card may require input of a pin for authorization of and completion of the transaction. The user may input the pin at the pin accepting device associated with the transaction. At this time, instead of inputting the user's standard pin, the user may input a marker code pin number that triggers a specific response. This response may include the completion of the transaction, but also one or more additional responses discussed in more detail below. Upon input of the marker code at the pin accepting device, the pin accepting device may recognize the marker code based on the data packet previously installed on the pin accepting device. The data packet may include the marker codes for each transaction card being used by a user. The data packet may also include program code requiring the pin accepting device to communicate, via a secure communicable linkage, the marker code inputted to the system. In this way, the system may be sent a signal from the transaction location pin accepting device that the pin accepting device received a pin that was set as a marker code for that particular transaction card.

Next, the system will identify the trigger response based on the specific marker code inputted via the pin accepting device at the transaction location, as illustrated in block 154. In this way, the system may identify the appropriate response based on the received marker code. The response may be triggered based on the input of the marker code at the pin accepting device. The response may be a monitoring or tracking of the transaction response. In other embodiments, the response may be an approve the transaction now but subsequently deny the transaction based on duress or the like. In other embodiments, the response may trigger a limit to the amount or time frame of the transaction. In other embodiments, the response may trigger a communication to authorities such as police or emergency responders. In yet other embodiments, the response may be a denial of the transaction.

Finally, as illustrated in block 156, the process 150 continues by triggering the activation of the response and communicating the response to the necessary third party based on the necessary response. In this way, the system may communicate with the necessary third party, such as a merchant, a financial institution, authorities, such as police, medical personal, or the like.

The user may be able to present an additional marker code to cancel the triggered response or approve the triggered response. In some embodiments, the additional marker code approval may be sent to a user mobile device, an authorized person's mobile device, or the like.

Figure 4:
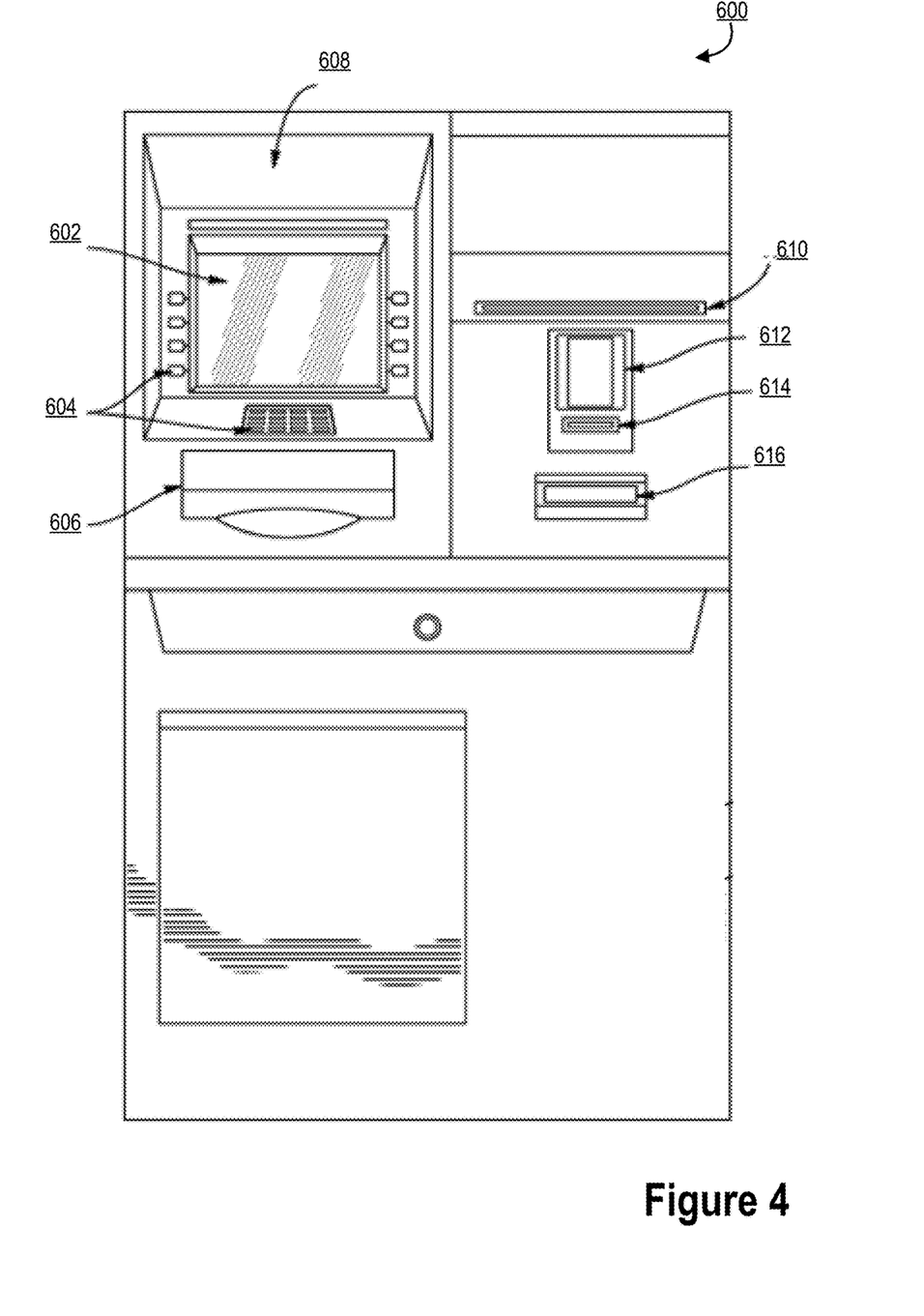
FIG. 4 is an interface illustrating a pin accepting device, in accordance with embodiments of the present invention.

FIG. 4 provides a representative illustration of a pin accepting device, in accordance with embodiments of the present invention. In the embodiment illustrated in FIG. 4, the pin accepting device is represented as an ATM 600. While an ATM is presented in FIG. 4, the pin accepting device may be an ATM, transaction device, kiosk, terminal, merchant location, online interface, or the like.

FIG. 4 provides a representative illustration of an ATM 600, in accordance with one embodiment of the present invention. In some embodiments, the representative ATM may comprise features similar to features found on a standard ATM. The lighting means 608 may be located above the display 602 that may provide a customer light for use during an ATM transaction. Of note, the display 602 may be vertically adjusted or horizontally adjusted along tracks or the like to position itself across the entire ATM 600. While currently illustrated in the upper left corner of the ATM 600, one will appreciate that the display may move to the right upper corner or below to the lower corners of the ATM 600 and/or anywhere in between if necessary. The lighting means 608 may also be moved with the ATM display 602 and provide the customer a safety mechanism to aid in the ATM transaction.

The cash receptacle 606 may provide the customer means for receiving cash that the customer requests for a withdraw through the ATM transaction. In some embodiments, the ATM 600 may also include a contactless identification sensor 612, a contact identification sensor 614 such as a debit or ATM card acceptor, a keypad 604, a receipt receptacle 610, and a deposit receptacle 616. In some embodiments, the contactless identifier 612 and/or the contact identifier 614 may provide the ATM 600 means of receiving identification from the customer. The customer may provide contactless or contact identification means through the ATM 600. The identification means using the contactless or contact identifications may be provided through several mechanisms, including, but not limited to, biometric identification, laser identification, magnetic strip identification, barcode identification, radio frequency (RF), a character recognition device, a magnetic ink, code readers, wireless communication, debit card scanning, ATM card scanning, and/or the like. The authentication from the contactless identifier of contact identifier may be read by the ATM application. After the authentication has been read, the system may provide the authentication to the financial institution to authorize an ATM transaction.

In some embodiments, the keypad 604 may provide for identification of the customer for use of the ATM 600. The keypad 604 may provide the customer means for inputting a pin number identification. In this way, the keypad 604 enables the customer to input his pin number into the ATM 600. In some embodiments, the pin number inputted on the keypad 604 may be read by the system. After the pin number has been read, the ATM 600 may receive the pin number and provide authentication of the identification with the financial institution system.

The display 602 provides a means for displaying information related to the customer's ATM transaction. Display information may be, but is not limited to display of interfaces, such as the start-up interface and an ATM transaction interface. In some embodiments, the display 402 is a touch screen display module.

Figure 5:
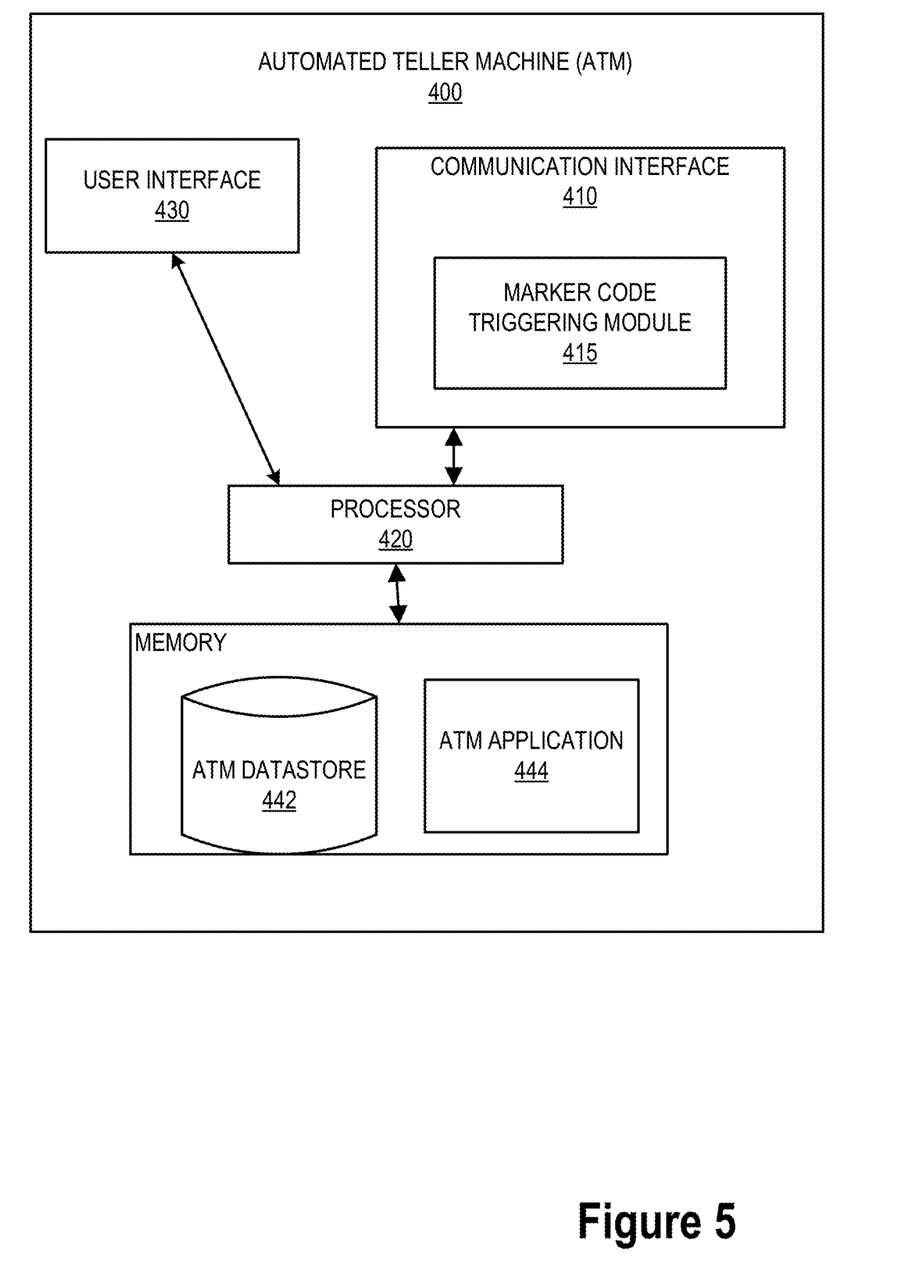
FIG. 5 illustrates a pin accepting device system environment, in accordance with embodiments of the present invention.

FIG. 5 illustrates a pin accepting device system environment, in accordance with embodiments of the present invention. Referring now to FIG. 5, as stated above, in some embodiments, the pin accepting device may be an automated teller machine (ATM). As illustrated in FIG. 5, the ATM 400 includes a communication interface 410, a processor 420, a user interface 430, and a memory 440 having an ATM datastore 442 and an ATM application 444 stored therein. As shown, the processor 420 is operatively connected to the communication interface 410, the user interface 430, and the memory 440.

The communication interface 410 of the ATM may include a marker code triggering module 415. The marker code triggering module 415 is configured to contactlessly and/or wirelessly send and/or receive information regarding the pin code or marker code inputted by the user. The marker code triggering module 415 may include a transmitter, receiver, smart card, key card, proximity card, radio frequency identification (RFID) tag and/or reader, and/or the like. In some embodiments, the marker code triggering module 415 communicates information via radio, IR, and/or optical transmissions. Generally, the marker code triggering module 415 is configured to operate as a transmitter and/or as a receiver. The marker code triggering module 415 functions to enable transactions with users and triggers markers of duress or the like associated with the user utilizing the marker code. Also, it will be understood that the marker code triggering module 415 may be embedded, built, carried, and/or otherwise supported in and/or on the ATM 400. In some embodiments, the marker code triggering module 415 is not supported in and/or on the ATM 400, but the marker code triggering module 415 is otherwise operatively connected to the ATM 400 (e.g., where the marker code triggering module 415 is a peripheral device plugged into the ATM 400 or the like). The marker code triggering module 415 of the ATM 400 is configured to contactlessly and/or wirelessly communicate information to and/or from the marker code generation system 206.

The communication interface 410 may generally also include a modem, server, transceiver, and/or other device for communicating with other devices and systems on a network.

The user interface 430 of the ATM 400 may include a display (e.g., a liquid crystal display, a touchscreen display, and/or the like) which is operatively coupled to the processor 420. The user interface 430 may include any number of other devices allowing the ATM 400 to transmit/receive data to/from a user, such as a keypad, keyboard, touch-screen, touchpad, microphone, mouse, joystick, other pointer device, button, soft key, and/or other input device(s).

As further illustrated in FIG. 5, the memory 440 may include ATM applications 444. It will be understood that the ATM applications 444 can be executable to initiate, perform, complete, and/or facilitate one or more portions of any embodiment described and/or contemplated herein. Generally, the ATM application 444 is executable to receive transaction instructions from the user and perform typical ATM functions, as appreciated by those skilled in the art. In some embodiments of the invention, the ATM application is configured to access content, such as data stored in memory 240, for example in the ATM datastore 442, or a database in communication with the ATM 400 and may transfer the content to the external apparatus if the external apparatus is configured for ATM communication. The content may include coupons, ads, offers, images, financial receipts, account-related documentation, reissued account card, new account card, prepaid cards, or the like.

Of course, the ATM 400 may require users to identify and/or authenticate themselves to the ATM 400 before the ATM 400 will initiate, perform, complete, and/or facilitate a transaction. For example, in some embodiments, the ATM 400 is configured (and/or the ATM application 444 is executable) to authenticate an ATM user based at least partially on an ATM debit card, smart card, token (e.g., USB token, or the like), username, password, pin, biometric information, and/or one or more other credentials that the user presents to the ATM 400. Additionally or alternatively, in some embodiments, the ATM 400 is configured to authenticate a user by using one-, two-, or multi-factor authentication. For example, in some embodiments, the ATM 400 requires two-factor authentication, such that the user must provide a valid debit card and enter the correct pin associated with the debit card in order to authenticate the user to the ATM 400. However, in some embodiments, the user may access the ATM 400 and view or receive content that may be transferred to/from the ATM 400.

Figure 6:
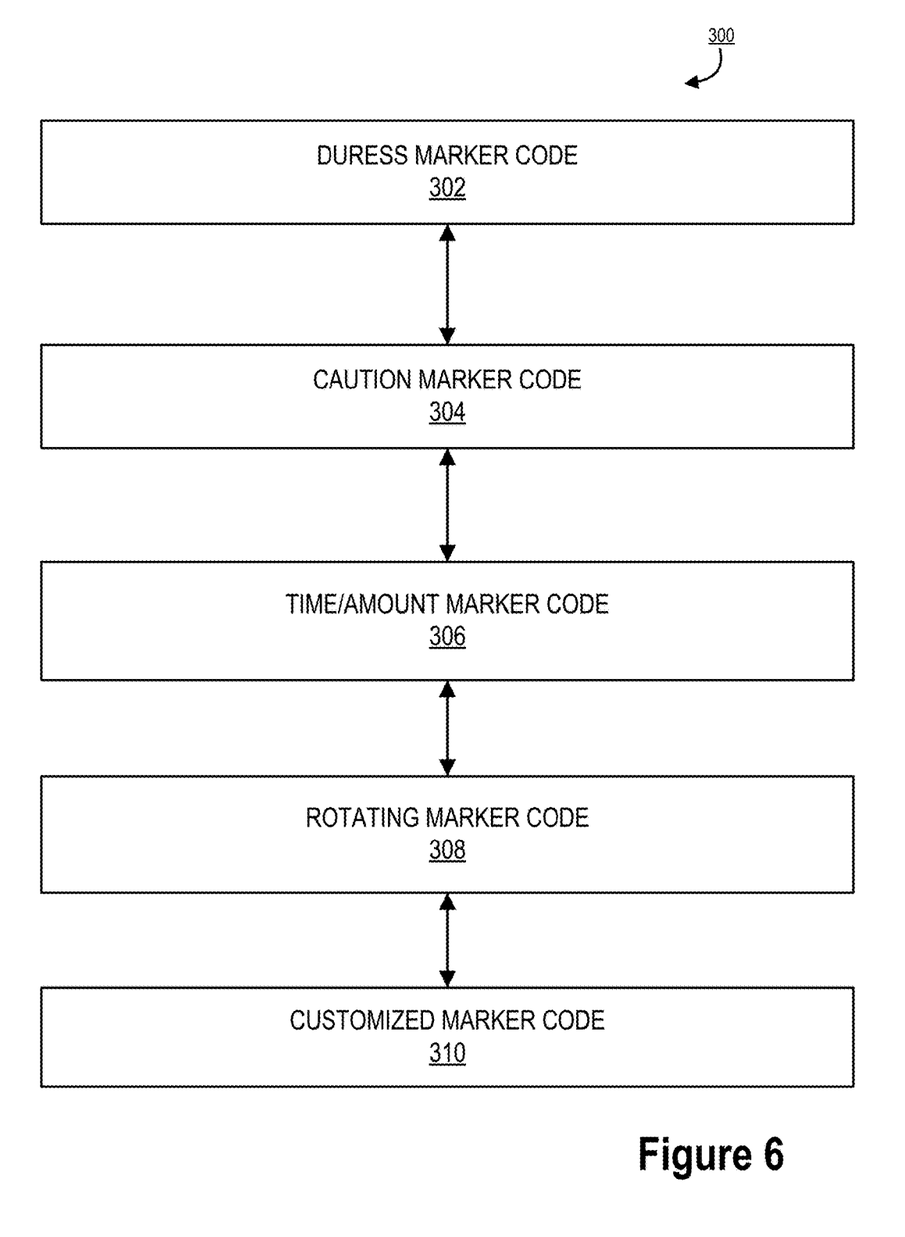
FIG. 6 is a flowchart illustrating various marker code triggers, in accordance with embodiments of the present invention.

FIG. 6 is a flowchart illustrating various marker code triggers 300, in accordance with embodiments of the present invention. As illustrated in FIG. 6, there are several marker codes that the user may select from. These marker codes may include duress marker codes 302, caution marker codes 304, time/amount marker codes 306, rotating marker codes 308, and/or customized marker codes 310. In some embodiments, the system may automatically generate marker codes to a transaction card associated with a user account. In other embodiments, the user may be able to customize the marker code and the triggered response from inputting the marker code at a pin accepting device to complete a transaction.

These marker codes may be a pin number used by a user at a transaction device, such as a pin accepting device or the like that may trigger a response by the system or a third party that is not a normal response based upon a pin input. Typically, a user may utilize a transaction card to complete a transaction. These transaction cards, in some instances, may require a pin number to authenticate the transaction and allow for completion of the transaction. Entering a pin at a pin accepting device will either authorize the completion of the transaction or deny the transaction. The generated marker codes associated with that transaction card trigger alternative, non-obvious, responses to the input of the specific marker code in place of the user's standard pin.

As illustrated in block 302, one type of marker code available for deployment on a transaction card includes a duress marker code. A duress marker code may be a pin that the user may input during a transaction at a pin accepting device that indicates the user is in duress. This may be because of an onlooker, bad actor, skimmer, or the like. In some embodiments, the system may automatically provide the user with a duress marker code associated with a transaction card. This duress marker code is provided as a reverse of the numbers or letters of the user's standard pin. In some embodiments, the user may input one or more duress marker codes. Furthermore, the system may integrate multiple levels of duress marker codes. As such, the triggered response performed by the system, based on a real-time identification of an input of a duress marker code, may vary. In some embodiments, the duress marker code may be a strong response. In this instance, the system may authorize the transaction but also may notify the authorities of the duress marker code via a silent alarm and provide the authorities with a location and request an immediate response to that location. The authorities may include police, fire, or other safety personal. In other embodiments, the user may input a soft duress marker code that may send deny the transaction or alternatively allow the transaction but track the transaction card or track the data on the card in the near future for variations. Furthermore, a soft duress marker code may activate local surveillance cameras and direct them to the user's location for surveillance of the transaction.

In this way, the user may be able to initiate multiple transactions without fear of duplication, skimming, misappropriation of card data or the like. The system may be able to track the data on the transaction card without alerting the bad actor. Furthermore, the system can limit cancelations of the transaction card to a specific site/card to avoid missing payments while waiting for a new transaction card.

As illustrated in block 304, one type of marker code available for deployment on a transaction card includes a caution marker code. A caution marker code may be a pin that the user may input during a transaction at a pin accepting device that indicates to the system and financial institutions a flagging of caution for that transaction. This may be because of an onlookers, a crowded location, or the like. In some embodiments, the system may automatically provide the user with a caution marker code associated with a transaction card. In some embodiments, the user may input one or more caution marker codes. Furthermore, the system may integrate multiple levels of caution marker codes. As such, the triggered response performed by the system, based on a real-time identification of an input of a caution marker code, may vary. In some embodiments, caution marker codes may be used to mark the transaction for monitoring by the system or a financial institution. As such, the caution marker codes may be used in large crowds, for large amounts of resources involved in the transaction, for use by associates, such as family members or friends using the user's transaction card, or the like. The monitoring of the transaction and future transactions may be performed in order to identify quickly of any potential misappropriation of the transaction card or pin associated with the transaction card.

As illustrated in block 306, one type of marker code available for deployment on a transaction card includes a time/amount marker code. A time/amount marker code may be a pin that the user may input during a transaction at a pin accepting device that indicates to the system and financial institution as only to be used for a specific time period and/or for a specific amount. This marker code may be utilized to limit the amount that the user or a user's associate can spend during a transaction and/or the time frame in which the spending can occur. In this way, the user may provide the time/amount marker code to a child, friend, spouse, or the like in order to make a purchase within a pre-defined time/amount. If the threshold amount or time has lapsed the transaction may be denied. Alternatively, in some embodiments, if the threshold amount or time has lapsed, the system may send a message to the user via his/her user device to request or approve authorization using the time/amount marker code. At that time, the user may override the denial and approve the application outside the time/amount threshold. In some embodiments, the system may automatically provide the user with a time/amount marker code associated with a transaction card. In some embodiments, the user may input one or more time/amount marker codes. Furthermore, the system may integrate multiple levels of time/amount marker codes. As such, the triggered response performed by the system, based on a real-time identification of an input of a time/amount marker code, may vary. In some embodiments, the system may not accept another transaction using the transaction card within an amount of time after the first transaction. In this way, the system may not allow another use of the card within an hour, two hours, or the like from a transaction using the marker code.

In other embodiments, the time/amount marker code 306 may require the user input two or more marker codes to access resources associated with an account. This may be based on a time of day, day of the week, or the like. As such, the user may require two pin numbers to enter into a transaction during the night.

As illustrated in block 308, one type of marker code available for deployment on a transaction card includes a rotating marker code. A rotating marker code may be a pin that the user may input during a transaction at a pin accepting device that indicates to the system and financial institutions for a transaction. In some embodiments, the system may automatically provide the user with a rotating marker code associated with a transaction card. In some embodiments, the user may input one or more rotating marker codes. Furthermore, the system may integrate multiple levels of rotating marker codes. The rotating marker codes may be inputted from a user and be rotated based on a time of day, merchant, location, or the like.

As illustrated in block 310, one type of marker code available for deployment on a transaction card includes a customized marker code. A customized marker code may be a pin that the user may input during a transaction at a pin accepting device that may have a customized trigger response. This may be because of an onlookers, a crowded location, associates using the transaction card, or the like. In some embodiments, the system may automatically provide the user with a customized marker code associated with a transaction card. In some embodiments, the user may input one or more customized marker codes. Furthermore, the system may integrate multiple levels of customized marker codes. As such, the triggered response performed by the system, based on a real-time identification of an input of a customized marker code, may vary.

In some embodiments, the marker codes may also be bio-data or geo-data codes. In this way, the user may be able to generate marker codes that include positioning of finger placement in a different direction, area, use of a different finger, or the like to indicate one of the marker codes. Furthermore, the location of a user use of a user device or pin accepting device may trigger the indication of a marker code, such as the moving of a pin accepting device to a different angle or the like.

Furthermore, each marker code may be disabled by the user. In this way, the user may be able to touch a number or letter on a mobile device or pin accepting device for an extended period of time (such as 5 seconds) in order to disable the marker code and thus not trigger the response.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for marker code generation and deployment for authority flagging and dispatch, the system comprising:
    a memory device with computer-readable program code stored thereon;
    a communication device;
    a processing device operatively coupled to the memory device and the communication device, wherein the processing device is configured to execute the computer-readable program code to:
        generate marker codes for one or more resource cards associated with a user, wherein the marker codes are coded for a specific pin input, bio-data input, or geo-data input that trigger a triggering response;
        determine triggering response for each of the marker codes generated, wherein one or more marker codes are generated for each resource card associated with the user;
        store user selected marker codes, automatically generated marker codes, and the determined triggering responses;
        distribute marker code data to pin accepting devices and within the marker code data code for direct communication of a use of the marker codes;
        identify the use of a marker code at a pin accepting device based on code direct communication from the pin accepting device;
        communicate to necessary third parties the triggering response associated the marker code used by the user at the pin accepting device;
        manipulate appropriate third party security and monitoring based on the triggering response associated the marker code used by the user at the pin accepting device; and
        allow user cancelation of the triggering response based on use of a predetermined cancelation marker input at a user device or the pin accepting device.

2. The system of claim 1, wherein the marker codes include duress marker codes, caution marker codes, and/or time/amount marker codes.

3. The system of claim 2, wherein duress marker codes triggering response comprises communicating a silent signal call to the authorities requesting an immediate response to the location of the pin accepting device, wherein use of the duress marker code allows a transaction using the resource card to be completed at the pin accepting device.

4. The system of claim 2, wherein caution marker codes triggering response comprises allowing a transaction using the resource card to be completed at the pin accepting device and continual monitoring of future use of the resource card for misappropriation.

5. The system of claim 2, wherein time/amount marker codes triggering response comprises authorizing a transaction using the resource card to be completed at the pin accepting device under a predetermined amount of resource used to complete the transaction and within a predetermined time from for completion of the transaction.

6. The system of claim 1, wherein the pin input, bio-data input, or geo-data input of the marker code is different than a standard authorization pin required for authorizing the one or more resource cards.

7. The system of claim 1, wherein generating marker codes for one or more resource cards associated with a user further comprises allowing for user selected marker codes and triggering responses by providing the user with a marker code generation interface for user input of the marker codes and the triggering responses.

8. The system of claim 1, wherein the pin accepting device is an ATM or third party point of transaction device used to complete a transaction using the resource card of the user, wherein the resource card of the user is a transaction card requiring a standard authorization pin for authorizing the transaction using the resource card.

9. A computer program product for marker code generation and deployment for authority flagging and dispatch, the computer program product comprising at least one non-transitory computer-readable medium having computer-readable program code portions embodied therein, the computer-readable program code portions comprising:

an executable portion configured for generating marker codes for one or more resource cards associated with a user, wherein the marker codes are coded for a specific pin input, bio-data input, or geo-data input that trigger a triggering response;

an executable portion configured for determining triggering response for each of the marker codes generated, wherein one or more marker codes are generated for each resource card associated with the user;

an executable portion configured for storing user selected marker codes, automatically generated marker codes, and the determined triggering responses;

an executable portion configured for distributing marker code data to pin accepting devices and within the marker code data code for direct communication of a use of the marker codes;

an executable portion configured for identifying the use of a marker code at a pin accepting device based on code direct communication from the pin accepting device;

an executable portion configured for communicating to necessary third parties the triggering response associated the marker code used by the user at the pin accepting device;

an executable portion configured for manipulating appropriate third party security and monitoring based on the triggering response associated the marker code used by the user at the pin accepting device; and an executable portion configured for allowing user cancelation of the triggering response based on use of a predetermined cancelation marker input at a user device or the pin accepting device.

10. The computer program product of claim 9, wherein the marker codes include duress marker codes, caution marker codes, and/or time/amount marker codes.

11. The computer program product of claim 10, wherein duress marker codes triggering response comprises communicating a silent signal call to the authorities requesting an immediate response to the location of the pin accepting device, wherein use of the duress marker code allows a transaction using the resource card to be completed at the pin accepting device.

12. The computer program product of claim 10, wherein caution marker codes triggering response comprises allowing a transaction using the resource card to be completed at the pin accepting device and continual monitoring of future use of the resource card for misappropriation.

13. The computer program product of claim 10, wherein time/amount marker codes triggering response comprises authorizing a transaction using the resource card to be completed at the pin accepting device under a predetermined amount of resource used to complete the transaction and within a predetermined time from for completion of the transaction.

14. The computer program product of claim 9, wherein the pin input, bio-data input, or geo-data input of the marker code is different than a standard authorization pin required for authorizing the one or more resource cards.

15. The computer program product of claim 9, wherein generating marker codes for one or more resource cards associated with a user further comprises allowing for user selected marker codes and triggering responses by providing the user with a marker code generation interface for user input of the marker codes and the triggering responses.

16. The computer program product of claim 9, wherein the pin accepting device is an ATM or third party point of transaction device used to complete a transaction using the resource card of the user, wherein the resource card of the user is a transaction card requiring a standard authorization pin for authorizing the transaction using the resource card.

17. A computer-implemented method for marker code generation and deployment for authority flagging and dispatch, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating marker codes for one or more resource cards associated with a user, wherein the marker codes are coded for a specific pin input, bio-data input, or geo-data input that trigger a triggering response;

determining triggering response for each of the marker codes generated, wherein one or more marker codes are generated for each resource card associated with the user;

storing user selected marker codes, automatically generated marker codes, and the determined triggering responses;

distributing marker code data to pin accepting devices and within the marker code data code for direct communication of a use of the marker codes;

identifying the use of a marker code at a pin accepting device based on code direct communication from the pin accepting device;

communicating to necessary third parties the triggering response associated the marker code used by the user at the pin accepting device;

manipulating appropriate third party security and monitoring based on the triggering response associated the marker code used by the user at the pin accepting device; and allowing user cancelation of the triggering response based on use of a predetermined cancelation marker input at a user device or the pin accepting device.

18. The computer-implemented method of claim 17, wherein the marker codes include duress marker codes, caution marker codes, and/or time/amount marker codes, wherein duress marker codes triggering response comprises communicating a silent signal call to the authorities requesting an immediate response to the location of the pin accepting device, wherein use of the duress marker code allows a transaction using the resource card to be completed at the pin accepting device, wherein caution marker codes triggering response comprises allowing a transaction using the resource card to be completed at the pin accepting device and continual monitoring of future use of the resource card for misappropriation, wherein time/amount marker codes triggering response comprises authorizing a transaction using the resource card to be completed at the pin accepting device under a predetermined amount of resource used to complete the transaction and within a predetermined time from for completion of the transaction.

19. The computer-implemented method of claim 17, wherein the pin input, bio-data input, or geo-data input of the marker code is different than a standard authorization pin required for authorizing the one or more resource cards.

20. The computer-implemented method of claim 17, wherein generating marker codes for one or more resource cards associated with a user further comprises allowing for user selected marker codes and triggering responses by providing the user with a marker code generation interface for user input of the marker codes and the triggering responses.

\* \* \* \* \*